Aug. 24, 1954  E. S. TITUS ET AL  2,687,269
VIBRATION ABSORPTION UNIT
Filed Oct. 25, 1950

INVENTORS
ELWIN S. TITUS
IAN M. HORNE.
BY
ATTORNEY

Patented Aug. 24, 1954

2,687,269

UNITED STATES PATENT OFFICE 2,687,269

VIBRATION ABSORPTION UNIT

Elwin S. Titus, Ridgewood, and Ian M. Horne, East Orange, N. J., assignors to Robinson Aviation, Inc., Teterboro, N. J., a corporation of New York Application October 25, 1950, Serial No. 191,976

7 Claims. (Cl. 248—358)

This invention relates to mechanical vibration absorption units of self-contained construction, which serve as mounts or supports to prevent the transmission of objectionable vibrations or harmful shocks to articles being supported. While specific shocks or vibrations can be neutralized along known engineering lines when space is available, the limitations of space necessarily present in relatively small self-contained units make it difficult to obtain a sufficient degree of absorption of both low and high frequency vibrations together with the ability to cushion occasional shocks of much greater force. The structural limitations imposed in such unit mounts have tended to make the transition from vibration absorption to shock impact absorption rather abrupt. The problem may be expressed as how to increase hysteresis without losing sensitivity to fine vibrations, so as to be strong enough to take major impacts yet responsive enough to continuously absorb vibrations that are hardly visible.

The present invention uses myriads of small elements of high absorptive power, so compacted and mutually supported that their hysteresis is high and increases in a non-linear manner under shock, giving a more gradual transition from fine vibration absorption to cushioning of heavier impacts. In order that the unit may employ the material most effectively subject to given space limitations, and handle occasional lateral loads without impairing the vertical efficiency, the compacted absorptive material, though relatively weak laterally, is carried substantially the full height of the unit and is reenforced laterally and vertically by more rigid elements taking up relatively little space. Thus the most effective material is used to the greatest advantage, while the elements that only occasionally come into use are adequate for their purpose.

The principal object of the invention is to obtain the most efficient vibration and shock absorption in a limited space. Other objects are to diminish resonance and increase stability; to prevent drift or permanent set, so as to extend the service life of the units; to improve the tolerance for underload and overload so as to make the units more adaptable; to improve the durability and prevent deterioration from the presence of oil or water or heat or cold; and to simplify manufacture and installation.

Referring now to the drawings forming part of this specification,

Similar reference numerals refer to similar parts thruout the various views. One or more of these mounting units may be used in an installation as required.

Figure 1:
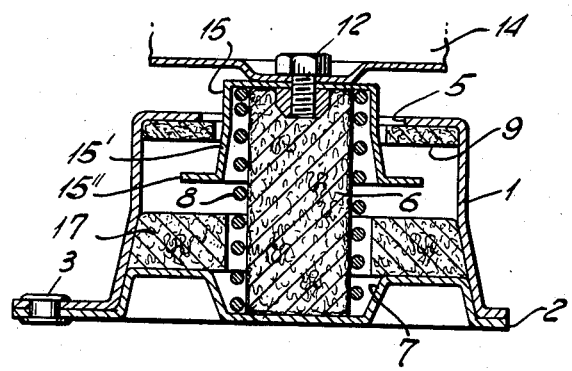
Fig. 1 is a vertical cross-sectional view of the device, taken on the line 1—1 of Fig. 2.
Figure 2:
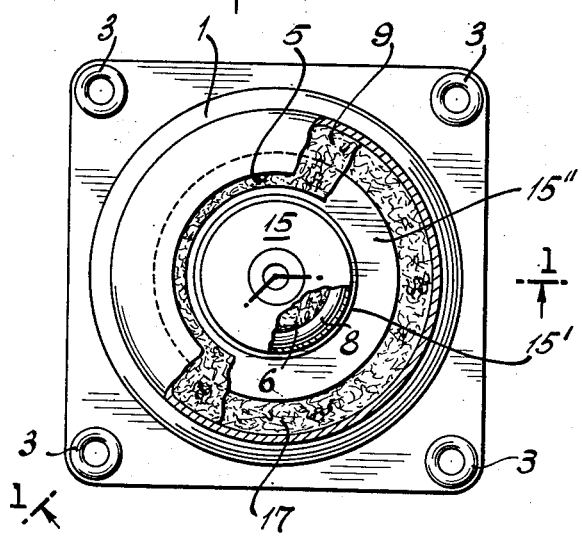
Fig. 2 is a plan view of the device, partly in section.

As shown in Fig. 1 and Fig. 2, the device consists of a housing or casing 1 having a base 2 which is secured to the housing 1 by any suitable means such as rivets, bolts or welding—eyelet rivets 3 being shown by way of example. Small drainage holes (not shown) are preferably provided in the bottom or lower side of the casing as is customary in such mounts. The top of the housing 1 has a relatively large central opening 5 thru which projects the principal vibration absorbing element 6 to be described. In the middle of the base 2 there is provided a centering cup or socket 7 in which is placed the cushioning element 6 and the associated helical spring 8, so as to hold them definitely against lateral deviation at the base. The upper portions of the cushion 6 and spring 8 are capable of lateral deviation so as to absorb both lateral as well as vertical shocks and vibrations. The lateral excursion at the top is limited by an annular pad or washer 9 of material to be described, which washer has a central opening somewhat larger than the diameter of the principal vibration absorption elements 6 and 8 and hence is normally not in contact with the same. The opening 5 in the top of the casing 1 is larger than the diameter of the hole in the washer pad 9 so that there is a deep ring of cushioning material in the body of the washer 9 to absorb shock before the main supporting elements could strike the solid metal of the casing top 5.

The core of the principal vibration absorption element 6 consists of a heterogeneous mass of fine, intermingled springy metallic wires formed into a coherent unit by a powerful press or otherwise contained so that it may thereafter be handled as a unit of a certain general shape and thus be capable of being inserted or removed from the case 1. The wires are very small in diameter—about the order of a hair or bristle—and the pressure of the forming process on the mass crimps many of them at innumerable points beyond their elastic limit so that they take a more or less permanent set that tends to bind them together as a coherent whole. Such a unit may be defined as a mass of compacted metallic wires extending in various directions and contacting each other at innumerable points of support so that the short strands of wire between said points act as vibration absorption springs and the points of contact between the wires act as frictional snubbers to produce in the aggregate a metallic vibration absorption material whose modulus of elasticity changes markedly under increasing amplitude so as to resist resonance and shock. It is characterized by a high hysteresis due to interwire friction, while at the same time having a delicate sensitivity to vibrations due to the springiness of very fine wires.

The pre-compressed mass of wires is preferably enclosed in a light sleeve or cover of woven or knitted material such as metal fabric to help hold it together. Any springy wire material of that general order of size may be used in the compacted mass, but it is preferable that non-corrosive materials such as stainless steel or beryllium copper be employed for permanent use. Such material is available on the market, being made in quantity principally for scrubbing or filtering of liquids; and it has special advantages in a vibration absorption combination, due to the peculiar load-deflection characteristics in the mass which are not present in individual metal springs nor in cork, felt or rubber.

The helical spring 8 surrounds the vibration absorption element 6 and is in frictional contact with the same so that any harmonics that might tend to develop in the spring 8 will be dampened by the element 6 which has entirely different natural characteristics. On the other hand, the helical spring 8 acts to strengthen, support and extend the range of the element 6 so that the unit becomes more adaptable to a greater variety of installations. The same size cushion and case can be used with helical springs of different sizes, thus reducing the number of stock types that must be manufactured.

The vibration absorption element 6 consists of a column or block of the pre-compressed mass of fine wires described, and it extends from the base socket 7 up thru the hole 5 and above the case to the load carrying bolt 12, as also does the helical spring 8. The bolt 12 may be used as a means of attachment to whatever article is to be protected from vibration, as indicated by the reference numeral 14.

An inverted cup or bell 15 is mounted on the top of the vibration absorption element 6 and spring 8 by means of the bolt 12, and fits the upper portion of the elements 6 and 8 rather closely thru the region where it is normally in action opposite the buffer ring 9. The inverted cup 15 then flares out as indicated at 15' and at the lower end has a flat annular rim 15'' extending outward toward the casing 1 but not so far as to touch it. The rim 15'' extends far enough out so that it will impinge on the under side of the washer pad 9 when the unit is without load or when the vibrations are of sufficient amplitude to carry the device to its extreme upward position. The spring and cushion system under normal load and vibrations usually plays freely in the intermediate region illustrated in Fig. 1 without the flange 15'' affecting the action. If overloaded or carried to its lower extreme by excessive vibration the flange 15'' impinges on the bottom cushion 17 which surrounds the vibration absorption element 6 and spring 8. This bottom cushion 17 is made of innumerable fine compacted wires similar to the construction of the vibration absorption element 6 and the washer pad 9.

The operation of the device will be apparent from the foregoing. The unloaded unit as shipped has the resilient elements 6 and 8 under sufficient initial compression so that they hold the inverted cup 15 in its extreme upward position with the flange 15'' against the buffer pad 9 and closing the opening. When in operation under the usual load the cup 15 and flange 15'' float in the general working position shown in Fig. 1 without touching either the buffer ring 9 or the bottom cushion 17. Extreme lateral forces may throw the cup 15 against the inner side of the ring 9, and this will occur sooner if the lateral vibrations are combined with extreme vertical vibrations, since this will bring the lower part of the bell 15' into action, whose diameter is greater than the upper part. Similarly, the lower flange 15'' will come into action sooner if the cup 15 is tilted under lateral forces, since one of its edges will strike the bottom cushion 17. All these factors tend to break up harmonics and make the transition from normal vibration absorption to the final cushioning of shock loads more gradual.

While I have in the foregoing described a certain specific form by way of example, it will be understood that it is merely for the purpose of illustration to make clear the principles of the invention, which is not limited to the particular form shown, but is susceptible to various modifications and adaptations in different installations as will be apparent to those skilled in the art without departing from the scope of the invention as stated in the following claims.

We claim:

1. In a vibration absorption unit, the combination of a casing having a base and a hole in the top of the casing, an annular resilient member at the top of the casing having a hole substantially concentric with and of lesser diameter than the hole in the top of the casing, an inverted cup whose upper portion extends above the top of the casing, said cup having side walls extending down thru the hole in the casing top and the hole in the annular resilient member, the diameter of said side walls being smaller than the hole in the annular resilient member so as to allow for normal lateral vibrations before the cup strikes the annular resilient member, a bottom cushion in the casing, a lateral flange on the lower portion of the inverted cup, said flange being normally spaced free from and between the annular resilient member and the bottom cushion so as to float therebetween, said flange impinging on the under side of the annular resilient member at the top for extreme upward vibrations and impinging on the bottom cushion under extreme downward vibrations, a main resilient element extending from the base up thru the bottom cushion and the annular resilient member at the top to the upper portion of the inverted cup above the top of the casing, a load supporting member at the upper portion of the inverted cup, said main resilient element extending substantially the entire distance between the base and the point of support of the load and absorbing vertical vibrations by changing its height and lateral vibrations by bending sideways.

2. In a vibration absorption unit, the combination of a casing having a base and a hole in the top of the casing, an annular resilient member at the top of the casing having a hole substantially concentric with and of lesser diameter than the hole in the top of the casing, an inverted cup whose upper portion extends above the top of the casing, said cup having side walls extending down thru the hole in the casing top and the hole in the annular resilient member, the diameter of said side walls being smaller than the hole in the annular resilient member so as to allow for normal lateral vibrations before the cup strikes the annular resilient member, the outside lower portion of the side walls of said cup flaring outward to reduce the lateral clearance to the annular resilient member under excessive vertical vibrations, a bottom cushion in the casing, a lateral flange on the bottom of the inverted cup, said flange being normally spaced free from and between the annular resilient member and the bottom cushion so as to float therebetween, said flange impinging on the under side of said annular resilient member at the top for extreme upward vibrations and impinging on the bottom cushion under extreme downward vibrations, a main resilient element extending from the base up thru the bottom cushion and the annular resilient member at the top to the upper portion of the inverted cup above the top of the casing, a load supporting member at the upper portion of the inverted cup, said main resilient element extending substantially the entire distance between the base and the point of support of the load and absorbing vertical vibrations by changing its height and lateral vibrations by bending sideways.

3. In a vibration absorption unit, the combination of a casing having a base and a hole in the top of the casing, an annular resilient member at the top of the casing having a hole substantially concentric with and of lesser diameter than the hole in the top of the casing, an inverted cup whose upper portion extends above the top of the casing, said cup having side walls extending down thru the hole in the casing top and the hole in the annular resilient member, the diameter of said side walls being smaller than the hole in the annular resilient member so as to allow for normal lateral vibrations before the cup strikes the annular resilient member, the outside lower portion of the side walls of the cup flaring outward to reduce the lateral clearance to the annular resilient member under excessive vertical vibrations, a bottom cushion in the casing, a lateral flange on the bottom of the inverted cup, said flange being normally spaced free from and between the annular resilient member and the bottom cushion so as to float therebetween, said flange impinging on the under side of said annular resilient member at the top for extreme upward vibrations and impinging on the bottom cushion under extreme downward vibrations, a helical spring extending from the base up thru the bottom cushion and the annular resilient member at the top to the upper portion of the inverted cup above the top of the casing, a load supporting member at the upper portion of the inverted cup, said helical spring extending substantially the entire distance between the base and the point of support of the load and absorbing vertical vibrations by changing its height and lateral vibrations by bending sideways.

4. In a vibration absorption unit, the combination of a casing having a base and a hole in the top of the casing, an annular resilient member at the top of the casing having a hole substantially concentric with and of lesser diameter than the hole in the top of the casing, an inverted cup whose upper portion extends above the top of the casing, said cup having side walls extending down thru the hole in the casing top and the hole in the annular resilient member, the diameter of said side walls being smaller than the hole in the annular resilient member so as to allow for normal lateral vibrations before the cup strikes the annular resilient member, a bottom cushion in the casing, a lateral flange on the lower portion of the inverted cup, said flange being normally spaced free from and between the annular resilient member and the bottom cushion so as to float therebetween, said flange impinging on the under side of the annular resilient member at the top for extreme upward vibrations and impinging on the bottom cushion under extreme downward vibrations, a load supporting member at the upper portion of the inverted cup, a main resilient element comprising a compacted mass of springly wires crimped at innumerable points beyond their elastic limit and intermingled so as to bind them together, said wires extending in various directions and contacting each other at innumerable points of support so that the short spans of wire between said points act as vibration absorption springs and the points of contact between the wires act as frictional snubbers, said main resilient element extending substantially the entire distance between the base and the point of support of the load and absorbing vertical vibrations by changing its height and lateral vibrations by bending sideways.

5. In a vibration absorption unit, the combination of a casing having a base and a hole in the top of the casing, an annular resilient member at the top of the casing having a hole substantially concentric with and of lesser diameter than the hole in the top of the casing, an inverted cup whose upper portion extends above the top of the casing, said cup having side walls extending down thru the hole in the casing top and the hole in the annular resilient member, the diameter of said side walls being smaller than the hole in the annular resilient member so as to allow for normal lateral vibrations before the cup strikes the annular resilient member, a lateral flange on said cup adapted to impinge on the annular resilient member to limit its upward motion, a load supporting member at the upper portion of the inverted cup, a main resilient element comprising a compacted mass of springy wires crimped at innumerable points beyond their elastic limit and intermingled so as to bind them together, said wires extending in various directions and contacting each other at innumerable points of support so that the short spans of wire between said points act as vibration absorption springs and the points of contact between the wires act as frictional snubbers, and a helical spring supplementing said compacted mass of wires and in contact with the same, said main resilient element and said helical spring extending substantially the entire distance between the base and the point of support of the load and absorbing vertical vibrations by changing height and lateral vibrations by bending sideways, both said main resilient element and said helical spring extending up inside the inverted cup at their upper portions.

6. In a vibration absorption unit, the combination of a casing having a base and a hole in the top of the casing, an annular resilient member at the top of the casing having a hole substantially concentric with and of lesser diameter than the hole in the top of the casing, a load supporting member including a generally cylindrical body having a portion extending above the top of the casing and having a portion extending through the hole in said casing which is of less diameter than the diameter of the hole in said annular resilient member so as to allow for normal lateral vibrations before said load supporting member strikes the annular resilient member, a bottom cushion in said casing, means on the lower portion of said load supporting member having an effective diameter greater than that of the hole in said annular resilient member and being normally spaced free from and between the annular resilient member and the bottom cushion so as to float therebetween, said means impinging on the underside of said annular resilient member at the top for extreme upward vibrations and impinging on the bottom cushion under extreme downward vibrations, and a resilient element extending between said base and said load supporting member to support said load supporting member under normal load with said means floating between said annular resilient member and said bottom cushion and to absorb vertical vibrations by changing its height and lateral vibrations by bending sideways, said resilient element comprising a compacted mass of springy wires crimped at innumerable points beyond their elastic limit and intermingled so as to bind them together, said wires extending in various directions and contacting each other at innumerable points of support so that the short spans of wire between said points act as vibration absorption springs and the points of contact between the wires act as frictional snubbers.

7. In a vibration absorption unit, the combination of a casing having a base and a hole in the top of the casing, an annular resilient member at the top of the casing having a hole substantially concentric with and of lesser diameter than the hole in the top of the casing, a load supporting member including a generally cylindrical body having a portion extending above the top of the casing and having a portion extending through the hole in said casing which is of less diameter than the diameter of the hole in said annular resilient member so as to allow for normal lateral vibrations before said load supporting member strikes the annular resilient member, a bottom cushion in said casing, means on the lower portion of said load supporting member having an effective diameter greater than that of the hole in said annular resilient member and being normally spaced free from and between the annular resilient member and the bottom cushion so as to float therebetween, said means impinging on the underside of said annular resilient member at the top for extreme upward vibrations and impinging on the bottom cushion under extreme downward vibrations, and a resilient element extending between said base and said load supporting member to support said load supporting member under normal load with said means floating between said annular resilient member and said bottom cushion and to absorb vertical vibrations by changing its height and lateral vibrations by bending sideways, said resilient element comprising a compacted mass of springy wires crimped at innumerable points beyond their elastic limit and intermingled so as to bind them together, said wires extending in various directions and contacting each other at innumerable points of support so that the short spans of wire between said points act as vibration absorption springs and the points of contact between the wires act as frictional snubbers, and a helical spring supplementing said compacted mass of wires and in contact with the same.

References Cited in the file of this patent

UNITED STATES PATENTS

| Number | Name | Date |
|---|---|---|
| 1,506,557 | Bird | Aug. 26, 1924 |
| 1,936,389 | Hallquist | Nov. 21, 1933 |
| 2,032,659 | Hussman | Mar. 3, 1936 |
| 2,044,649 | Swennes et al. | June 16, 1936 |
| 2,357,120 | Kuebert et al. | Aug. 29, 1944 |
| 2,457,058 | Markowitz | Dec. 21, 1948 |
| 2,462,316 | Goodloe | Feb. 22, 1949 |
| 2,519,702 | Robinson | Aug. 22, 1950 |
| 2,520,442 | Schwartz | Aug. 29, 1950 |

FOREIGN PATENTS

| Number | Country | Date |
|---|---|---|
| 606,616 | Germany | Feb. 18, 1933 |